(12) United States Patent
Lee et al.

(10) Patent No.: US 7,781,546 B2
(45) Date of Patent: *Aug. 24, 2010

(54) SLURRY PHASE POLYMERISATION PROCESS

(75) Inventors: Stephen Kevin Lee, London (GB); Brent R. Walworth, Sint-Niklaas (BE); Daniel Marissal, Braine-Le-Comte (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 0 days.

This patent is subject to a terminal disclaimer.

(21) Appl. No.: 11/667,017

(22) PCT Filed: Nov. 22, 2005

(86) PCT No.: PCT/GB2005/004476

§ 371 (c)(1),
(2), (4) Date: May 4, 2007

(87) PCT Pub. No.: WO2006/056756

PCT Pub. Date: Jun. 1, 2006

(65) Prior Publication Data

US 2008/0132655 A1    Jun. 5, 2008

(30) Foreign Application Priority Data

Nov. 26, 2004 (GB) .................. 0426059.2

(51) Int. Cl.
C08F 2/12 (2006.01)
B01J 19/18 (2006.01)
C08F 10/02 (2006.01)

(52) U.S. Cl. .................. 526/64; 526/918; 422/132

(58) Field of Classification Search .................. 526/64, 526/920, 918; 422/132
See application file for complete search history.

(56) References Cited

U.S. PATENT DOCUMENTS

| | | | |
|---|---|---|---|
| 3,172,737 A | 3/1965 | Whittington | |
| 3,203,766 A | 8/1965 | Mudd et al. | |
| 3,242,150 A | 3/1966 | Scoggin | |
| 3,248,179 A | 4/1966 | Norwood | |
| 3,257,362 A | 6/1966 | Norwood | |
| 3,293,000 A | 12/1966 | Marwil | |
| 3,324,093 A | 6/1967 | Alleman | |
| 4,121,029 A | 10/1978 | Irvin et al. | |
| 4,613,484 A | 9/1986 | Ayres | |
| 4,794,151 A | 12/1988 | Mueller-Mall et al. | |
| 5,484,862 A | 1/1996 | Siddall et al. | |
| 5,565,175 A | 10/1996 | Hottovy et al. | |
| 6,204,344 B1 | 3/2001 | Kendrick et al. | |
| 6,239,235 B1 | 5/2001 | Hottovy et al. | |
| 6,281,300 B1 | 8/2001 | Kendrick | |
| 6,319,997 B1 | 11/2001 | Kendrick et al. | |
| 6,369,173 B1 | 4/2002 | Kim et al. | |
| 6,420,497 B1 | 7/2002 | Kufeld et al. | |
| 6,664,352 B1 | 12/2003 | Fredriksen et al. | |
| 6,670,431 B2 | 12/2003 | Kendrick et al. | |
| 6,743,869 B2 | 6/2004 | Franklin, III et al. | |
| 6,800,698 B2 | 10/2004 | Kendrick et al. | |
| 6,806,324 B2 | 10/2004 | Hottovy et al. | |
| 6,815,511 B2 | 11/2004 | Verser et al. | |
| 6,818,186 B2 | 11/2004 | Burns et al. | |
| 6,833,415 B2 | 12/2004 | Kendrick et al. | |
| 6,858,682 B2 | 2/2005 | Kendrick et al. | |
| 6,908,971 B2 | 6/2005 | Burns et al. | |
| 6,926,868 B2 | 8/2005 | Kendrick et al. | |
| 7,014,821 B2 | 3/2006 | Hottovy et al. | |
| 7,015,289 B2 | 3/2006 | Hottovy et al. | |
| 7,033,545 B2 | 4/2006 | Kufeld et al. | |
| 7,034,090 B2 | 4/2006 | Kendrick | |
| 7,268,194 B2 | 9/2007 | Kendrick et al. | |
| 2002/0111441 A1 | 8/2002 | Kendrick et al. | |
| 2002/0182121 A1 | 12/2002 | Kendrick | |
| 2002/0187081 A1 | 12/2002 | Hottovy et al. | |
| 2003/0012705 A1 | 1/2003 | Hottovy et al. | |
| 2003/0023010 A1 | 1/2003 | Hottovy et al. | |
| 2003/0027944 A1 | 2/2003 | Hottovy et al. | |
| 2003/0050409 A1 | 3/2003 | Hottovy et al. | |
| 2003/0083444 A1 | 5/2003 | McElvain et al. | |
| 2003/0092856 A1 | 5/2003 | Hottovy et al. | |

(Continued)

FOREIGN PATENT DOCUMENTS

EP    0 432 555 A2    11/1990

(Continued)

OTHER PUBLICATIONS

Sato, Y., et al; "Flow Pattern, Circulation Velocity and Pressure Loss in Loop Reactor"; *Journal of Chemical Engineering of Japan*; vol. 12, No. 6; pp. 448-453 (1979).

(Continued)

*Primary Examiner*—Fred M Teskin
(74) *Attorney, Agent, or Firm*—Nixon & Vanderhye

(57) ABSTRACT

A process comprising polymerising in a loop reactor of continuous tubular construction an olefin monomer optionally together with an olefin comonomer in the presence of a polymerisation catalyst in a diluent to produce a slurry comprising solid particulate olefin polymer and the diluent wherein the internal diameter of at least 50% of the total length of the reactor is at least 700 millimeters and the solids concentration in the reactor is at least 20 volume % is disclosed.

14 Claims, No Drawings

U.S. PATENT DOCUMENTS

| | | | |
|---|---|---|---|
| 2003/0109651 A1 | 6/2003 | Kufeld et al. | |
| 2003/0191251 A1 | 10/2003 | McGrath | |
| 2003/0229187 A1* | 12/2003 | Kufeld et al. | 526/64 |
| 2004/0136881 A1 | 7/2004 | Verser et al. | |
| 2004/0192860 A1 | 9/2004 | Hottovy et al. | |
| 2004/0198928 A1 | 10/2004 | Kendrick et al. | |
| 2005/0186126 A1 | 8/2005 | Burns et al. | |
| 2005/0272891 A1* | 12/2005 | Fouarge et al. | 526/943 |
| 2007/0078237 A1 | 4/2007 | McElvain et al. | |
| 2007/0274873 A1 | 11/2007 | Kendrick et al. | |

FOREIGN PATENT DOCUMENTS

| | | |
|---|---|---|
| EP | 0 432 555 A2 | 6/1991 |
| EP | 0 432 555 A3 | 6/1991 |
| EP | 0 891 990 A2 | 1/1999 |
| EP | 891990 A2 | 1/1999 |
| EP | 891 990 A3 | 11/1999 |
| EP | 1 195 388 A1 | 4/2002 |
| EP | 891 990 B1 | 9/2004 |
| WO | WO 00/22011 A2 | 4/2000 |
| WO | WO 00/22011 A3 | 4/2000 |
| WO | WO 02/28922 | 4/2002 |
| WO | WO 03/039739 | 5/2003 |
| WO | WO 2004/024780 | 3/2004 |
| WO | WO 2004/024781 | 3/2004 |
| WO | WO 2004/024782 A2 | 3/2004 |
| WO | WO 2004/024782 A3 | 3/2004 |
| WO | WO 2004/027264 A2 | 4/2004 |
| WO | WO 2004/027264 A3 | 4/2004 |
| WO | WO 2005/028097 A1 | 3/2005 |
| WO | WO 2005/044871 | 5/2005 |
| WO | WO 2005/077994 | 8/2005 |
| WO | WO 2006/003144 | 1/2006 |

OTHER PUBLICATIONS

SRI International Supplement D, Report No. 19D (1989).

International Standard; Plastics—Methods for determining the density of non-cellular plastics—Part 1: Immersion method, liquid pyknometer method and titration method; ISO 1183-1; First Edition Feb. 1, 2004.

Abstract, Process Economics Program Report 19E; "Biomodal Linear Low-Density Polyethylene", 137 pgs (Nov. 1999).

Abstract, Process Economics Program Report 19F; "Supercritical Loop Reactor Slurry Process for Producing Polyethylene and Polypropylene", 134 pgs (Jun. 1996).

Abstract, Process Economics Program Report No. 19C; "High Density Polyethylene", 300 pgs.

Magovern, Robert L.; Process Economics Program; Report No. 19; "Linear Polyethylene and Polypropylene", 350 pgs. (Nov. 1966).

Magovern, Robert L.; Process Economics Program; Report No. 19-A; "Linear Polyethylene and Polypropylene Supplement A", 222 pgs. (Oct. 1969).

Magovern, Robert L.; Process Economics Program; Report No. 19B; "Linear Polyethylene and Polypropylene Supplement B"; 169 pgs. (Feb. 1974).

* cited by examiner

SLURRY PHASE POLYMERISATION PROCESS

BACKGROUND OF THE INVENTION

The present invention is concerned with olefin polymerisation in slurry phase loop reactors.

Slurry phase polymerisation of olefins is well known wherein an olefin monomer and optionally olefin comonomer are polymerised in the presence of a catalyst in a diluent in which the solid polymer product is suspended and transported.

DESCRIPTION OF THE INVENTION

This invention is specifically related to polymerisation in a loop reactor where the slurry is circulated in the reactor typically by means of a pump or agitator. Liquid full loop reactors are particularly well known in the art and are described for example in U.S. Pat. Nos. 3,152,872, 3,242,150 and 4,613,484.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 m$^3$. the loop reactors of the present invention are of this generic type.

Maximum commercial scale plant capacities have increased steadily over the years. Growing operating experience over the last few decades has led to operation of increasingly high slurry and monomer concentrations in reaction loops. The increase in slurry concentrations has typically been achieved with increased circulation velocities achieved for example by higher reactor circulation pump head or multiple circulation pumps as illustrated by EP 432555 and EP 891990. The increase in solids loading is desirable to increase reactor residence time for a fixed reactor volume and also to reduce downstream diluent treatment and recycling requirements. The increased velocity and head requirement of the loop has however led to increasing pump design sizes and complexity, and energy consumptions as slurry concentrations increase. This has both capital and operating cost implications.

Historically the circulation velocity in the reaction loop has typically been maximised to ensure maintenance of good thermal, compositional and particle distribution across the reactor cross-section, particularly the avoidance of solids settling, stable flow characteristics, or excessive solids concentrations at the pipe wall rather than reduced to minimise pressure drop/power in the polymerisation loop.

Inadequate cross-sectional distribution could lead to increased fouling, reduced heat transfer and reduced polymer productivity and homogeneity. Construction and commissioning of new commercial plants is very expensive and therefore new designs seek to avoid or minimise changes to operating parameters that are seen to increase risk to the successful operation of the new unit.

In accordance with the present invention there is provided a process comprising polymerising in a loop reactor of a continuous tubular construction an olefin monomer optionally together with an olefin comonomer in the presence of a polymerisation catalyst in a diluent to produce a slurry comprising solid particulate olefin polymer and the diluent wherein the average internal diameter of at least 50% of the total length of the reactor is at least 700 millimeters and the solids concentration in the reactor is at least 20 volume %

One advantage of the present invention is that the specific energy consumption of the reactor (i.e. the energy consumed per unit weight of polymer produced) is reduced whilst maintaining a given reactor residence time and avoiding unacceptable reactor fouling. The invention is especially advantageous when it is desired to design and operate a plant at high solids loadings when it has previously been considered necessary to use what have now been found to be excessively high loop circulation velocities.

This invention relates to a method and apparatus for continuous polymerization of olefins, preferably alpha mono olefins, in an elongated tubular closed loop reaction zone. The olefin(s) is continuously added to, and contacted with, a catalyst in a hydrocarbon diluent. The monomer(s) polymerise to form a slurry of solid particulate polymer suspended in the polymerisation medium or diluent.

Typically, in the slurry polymerisation process of polyethylene, the slurry in the reactor will comprise the particulate polymer, the hydrocarbon diluent(s), (co) monomer(s), catalyst, chain terminators such as hydrogen and other reactor additives In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 2-20, preferably 4-10 weight percent of the slurry.

The slurry is pumped around the relatively smooth path-endless loop reaction system at fluid velocities sufficient (i) to maintain the polymer in suspension in the slurry and (ii) to maintain acceptable cross-sectional concentration and solids loading gradients.

It has now been found that, for high solids loadings, cross-sectional slurry concentration distributions (as evidenced by fouling, flow variations and/or heat transfer) can be maintained within acceptable operating limits whilst increasing the internal diameter of the tubular reactor above that which is conventionally regarded as operationally reliable. This is contrary to what the man skilled in the art would believe to be the case in the light of conventional process conditions where the internal diameter of the reactor is no greater than 600 millimeters and is typically about 500 millimeters.

The solids concentration in the slurry in the reactor will typically be above 20 vol %, preferably about 30 volume %, for example 20-40 volume %, preferably 25-35 volume % where volume % is [(total volume of the slurry—volume of the suspending medium)/(total volume of the slurry)]×100. The solids concentration measured as weight percentage which is equivalent to that measured as volume percentage will vary according to the polymer produced but more particularly according to the diluent used. Where the polymer produced is polyethylene and the diluent is an alkane, for example isobutane it is preferred that the solids concentration is above 30 in particular above 40 weight % for example in the range 40-60 preferably 45%-55 weight % based on the total weight of the slurry.

It is a feature of the present invention that operation of the process can be carried out in larger diameter reactors than are conventionally used in slurry polymerisation without any significant problems particularly from fouling at the reactor walls. For example, reactors having internal diameters over 700 millimeters, in particular over 750 for example over 850, preferably between 700 and 800 millimetres can be used where historically there would have been increased concern. It is preferred that greater than 50%, in particular greater than 70%, for example greater than 85% of the total length of the reactor has an internal diameter over 700 millimeters, in particular over 750 millimeters, for example between 700 and 800 millimeters A particular advantage of this invention is therefore that high slurry concentrations at relatively low circulation velocities and relatively high reactor loop diameters can be used. A further embodiment of the present invention is a process comprising polymerising in a loop reactor an olefin monomer optionally together with an olefin comonomer in the presence of a polymerisation catalyst in a diluent to produce a slurry comprising solid particulate olefin polymer and the diluent wherein the Froude number is maintained at or below 20, preferably 3-10 and the internal diameter of the reactor is in the range 700-800 millimeters.

The Froude number is preferably maintained at or below 30, for example in the range 20 to 1 preferably in the range 15 to 2, more preferably in the range 10 to 3. The Froude number is a dimensionless parameter indicative of the balance between the suspension and settling tendencies of particles in a slurry. It provides a relative measure of the momentum transfer process to the pipe wall from particles compared to the fluid. Lower values of the Froude number indicate stronger particle-wall (relative to fluid-wall) interactions. The Froude number (Fr) is defined as $v^2/(g(s-1)D)$ where v is the average velocity of the slurry, g is the gravitational constant, s is the specific gravity of the solid in the diluent and D is the internal pipe diameter. The specific gravity of the solid polymer which is the ratio of the density of the polymer to the density of the suspending medium is based on the annealed density of the degassed polymer after being substantially devolatilised and immediately prior to any extrusion as measured using method ISO1183A.

It has been found that reactors can be designed and operated at specific pressure drop both per unit reactor length and per mass of polymer and total pressure drop for the loop less than that taught as being required, particularly at high solids loadings and large reactor diameters. This invention permits total loop pressure drops of less than 1.3 bar, particularly less than 1 bar even for polymer production rates of above 25, even above 45 tonnes per hour It is possible to employ one or more than one pump in the loop preferably on one or more horizontal sections; these can be located on the same horizontal section or on different sections. The pump or pumps can be of the same diameter or larger or smaller diameter preferably of the same diameter as the internal diameter of the section of the reactor where the pump or pumps are located. It is preferable to employ a single pump and it is a feature of the present invention that requirements for number and power of pump(s) is less onerous than for conventional processes.

Reactor size is typically over 20 m³ in particular over 50 m³ for example 75-200 m³ preferably in the range 100-175 m³

Use of higher internal diameter reactors as set out herein above enables reactors, for example having volumes of greater than 80 m³, to be built with a reactor length to diameter ratio of less than 500, preferably less than 400 more preferably less than 250. Reduction in reactor length to diameter ratio minimises compositional gradients around the reaction loop and enables production rates of greater than 25 tonnes (per reactor) per hour to be achieved with only a single point of introduction for each reagent around the reaction loop. Alternatively it is possible to have multiple inlets into the loop reactor for reactants (e.g. olefins), catalyst, or other additives.

The pressure employed in the loop will be sufficient to maintain the reaction system 'liquid full' i.e. there is substantially no gas phase. Typical pressures used are between 1-100 bara, preferably between 30 to 50 bara. In ethylene polymerization the ethylene partial pressure will typically be in the range 0.1 to 5 MPa, preferably from 0.2 to 2 MPa, more particularly from 0.4 to 1.5 MPa. The temperatures selected are such that substantially all of the polymer produced is essentially (i) in a non-tacky and non-agglomerative solid particular form and (ii) insoluble in the diluent. The polymerization temperature depends on the hydrocarbon diluent chosen and the polymer being produced. In ethylene polymerisation the temperature is generally below 130 C, typically between 50 and 125 C., preferably between 75 and 115 C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-115 C. The space time yield which is production rate of polymer per unit of loop reactor volume for the process of the present invention is in the range 0.1-0.4 preferably 0.2-0.35 ton/hour/m³.

The process according to the invention applies to the preparation of compositions containing olefin (preferably ethylene) polymers which can comprise one or a number of olefin homo-polymers and/or one or a number of copolymers. It is particularly suited to the manufacture of ethylene polymers and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

Typical diluents employed in such reactions include hydrocarbons having 2 to 12, preferably 3 to 8, carbon atoms per molecule, for example linear alkanes such as propane, n-butane, n-hexane and n-heptane, or branched alkanes such as isobutane, isopentane, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50% (preferably at least 70%) of the polymer formed is insoluble therein. Isobutane is particularly preferred as the diluent for ethylene polymerisation.

The operating conditions can also be such that the monomers (e.g. ethylene, propylene) act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal. via a single or multiple withdrawal ports, the location of which can be anywhere on the loop reactor but is preferably adjacent to the downstream end of a horizontal section of the loop. Any continuous withdrawal ports will typically have an internal diameter in the range 2-25, preferably 4-15, especially 5-10 cm This invention permits large scale polymerisation reactors to be operated with low diluent recovery requirements. The operation of large diameter reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided.

It has been found that the slurry concentration in the reactor loop can be optimised by controlling the average particle size and/or the particle size distribution of the powder within the reactor loop. The principal determinant of the average particle size of the powder is the residence time in the reactor. The particle size distribution of the catalyst can be affected by many factors including the particle size distribution of the catalyst fed to the reactor, the initial and average catalyst activity, the robustness of the catalyst support and susceptibility of the powder to fragment under reaction conditions. Solids separating devices (such as hydrocyclones) can be used on the slurry withdrawn from the reactor loop to further assist in control of the average particle size and the particle size distribution of the powder in the reactor. The location of the withdrawal point for the concentrating device and the design and operating conditions of the concentrating device system, preferably the at least one hydrocyclone recycle loop, also enables the particle size and particle size distribution within the reactor to be controlled. The average particle size is preferably between 100 and 1500 microns, most preferably between 250 and 1000 microns.

The withdrawn, and preferably concentrated, polymer slurry is depressurised, and optionally heated, prior to introduction into a primary flash vessel. The stream is preferably heated after depressurisation.

The diluent and any monomer vapors recovered in the primary flash vessel are typically condensed, preferably without recompression and reused in the polymerization process. The pressure of the primary flash vessel is preferably controlled to enable condensation with a readily available cooling medium (e.g. cooling water) of essentially all of the flash vapour prior to any recompression. typically such pressure in said primary flash vessel will be 4-25 for example 10-20, preferably 15-17 bara. The solids recovered from the primary flash vessel is preferably passed to a secondary flash vessel to remove residual volatiles. Alternatively the slurry may be passed to a flash vessel of lower pressure than in the above mentioned primary vessel such that recompression is needed to condense the recovered diluent. Use of a high pressure flash vessel is preferred.

The process according to the invention can be used to produce resins which exhibit specific density in the range 0.890 to 0.930 (low density), 0.930 to 0.940 (medium density) or 0.940 to 0.970 (high density).

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an alumoxane or by an ionising agent as described, for example, in Patent Application EP-500,944-A1 (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained, with those comprising:
from 10 to 30% by weight of transition metal, preferably from 15 to 20% by weight,
from 20 to 60% by weight of halogen, preferably from 30 to 50% by weight
from 0.5 to 20% by weight of magnesium, usually from 1 to 10% by weight,
from 0.1 to 10% by weight of aluminium, generally from 0.5 to 5% by weight,
the balance generally consists of elements arising from the products used for their manufacture, such as carbon, hydrogen and oxygen. The transition metal and the halogen are preferably titanium and chlorine.

Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. Organoaluminium compounds, especially those which are not halogenated, are well suited. Triethylaluminium and triisobutylaluminium are especially advantageous.

The chromium-based catalyst is preferred to comprise a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 m.sup.2/g, preferably from 400 to 550 m.sup.2/g and a volume porosity of greater than 2 cc/g preferably from 2 to 3 cc/g.

Silica supported chromium catalysts are typically subjected to an initial activation step in air at an elevated activation temperature. The activation temperature preferably ranges from 500 to 850.degree. C., more preferably 600 to 750.degree. C.

The reactor loop can be used to make monomodal or multimodal, for example bimodal, polymers. The multi-modal polymers can be made in a single reactor or in multiple reactors. The reactor system can comprise one or more loop reactors connected in series or in parallel. The reactor loop may also be preceded or followed by a polymerisation reactor that is not a loop reactor.

In the case of series reactors, a first reactor of the series is supplied with catalyst and the cocatalyst in addition to the diluent and monomer, and each subsequent reactor is supplied with, at least, monomer, in particular ethylene and with the slurry arising from a preceding reactor of the series, this mixture comprising the catalyst, the cocatalyst and a mixture of the polymers produced in a preceding reactor of the series. It is optionally possible to supply a second reactor and/or, if appropriate, at least one of the following reactors with fresh catalyst and/or cocatalyst. However, it is preferable to introduce the catalyst and the cocatalyst exclusively into a first reactor.

In the case where the plant comprises at least two reactors in series, the polymer of highest melt index and the polymer of lowest melt index can be produced in two adjacent or non-adjacent reactors in the series. Hydrogen is maintained at (i) a low (or zero) concentration in the reactor(s) manufacturing the high molecular weight components, e.g. hydrogen percentages including between 0-0.1 vol % and at (ii) a very high concentration in the reactor(s) manufacturing the low molecular weight components e.g. hydrogen percentages between 0.5-2.4 vol %. The reactors can equally be operated to produce essentially the same polymer melt index in successive reactors.

Particular sensitivity to operating in large diameter reactors (and associated cross-sectional compositional, thermal or particulate gradients) has however been related to production of polymer resins where polymer of either high or low molecular weight resins has been known to lead to increased fouling concerns. Particularly when producing polymers of molecular weights less than 50 kDaltons or greater than 150 kDaltons. These concerns have particularly been confirmed to be accentuated at low polymer solids concentrations in the reactor loop. When producing polymers of molecular weights less than 50 kDaltons or greater than 200 kDa (or melt index below 0.1 and above 50) in large diameter reactors it has however surprisingly been discovered that fouling is decreased when solids loadings are increased to above 20 vol %, particularly above 30 vol %. The present invention further comprises a loop reactor of a continuous tubular construction having at least 2 horizontal sections and at least 2 vertical sections wherein the internal diameter of at least 50% of the total length of the reactor is at least 700 millimeters

EXAMPLE

In an elongated closed loop tubular reactor having an internal diameter of 765 millimetres and a volumetric capacity of 167.5 m$^3$, ethylene is copolymerised with hexene-1 at a temperature of 93° C. and a pressure of 41 bara in isobutane as diluent and using a Chromium catalyst to produce a copolymer having a MI5 of 0.85 g/10 Minutes and a density of 938 kg/m$^3$. An essentially constant solids loading of about 56 wt % is maintained for a period of several days. The reactor circulation pump power as measured by the power transducer on the pump motor control system and heat transfer coefficient as measured by monitoring coolant water flow and coolant water temperature change compared to reactor temperature remain stable, resulting in essentially no change in either parameter respectively, indicating that there is no detectable fouling of the reactor as evidenced by a build up of polymer on the walls of the reactor, and that flow is stable and well distributed as evidenced by the stable pump power readings

The invention claimed is:

1. A process comprising polymerising in a loop reactor of continuous tubular construction an olefin monomer optionally together with an olefin comonomer in the presence of a polymerisation catalyst in a diluent to produce a slurry comprising solid particulate olefin polymer and the diluent wherein the internal diameter of at least 50% of the total length of the reactor is at least 700 millimeters, wherein the solids concentration in the reactor is at least 20 volume % and wherein the Froude number is maintained below 30.

2. A process as claimed in claim 1 wherein the solids concentration in the reactor is in the range 25-35 volume %.

3. A process as claimed in either claim 1 wherein the internal diameter of at least 50% of the total length of the reactor is over 750 millimeters.

4. A process as claimed in claim 1 wherein the internal diameter of at least 70% of the total length of the reactor is over 700 millimeters.

5. A process as claimed in claim 4 wherein the internal diameter of at least 85% of the total length of the reactor is over 700 millimeters.

6. A process as claimed in claim 1 wherein the space time yield is in the range of 0.2 to 0.35 ton/hour/m$^3$.

7. A loop reactor of a continuous tubular construction having at least 2 horizontal sections and at least 2 vertical sections wherein the internal diameter of at least 50% of the total length of the reactor is at least 700 millimeters, wherein the ratio of reactor length to internal diameter is less than 250.

8. A loop reactor as claimed in claim 7 wherein the internal diameter of at least 50% of the total length of the reactor is over 750 millimeters.

9. A loop reactor as claimed in claim 7 wherein the internal diameter of at least 70% of the total length of the reactor is at least 700 millimeters.

10. A loop reactor as claimed in claim 7 wherein the internal diameter of at least 85% of the total length of the reactor is at least 700 millimeters.

11. A loop reactor as claimed in claim 7 wherein the reactor size is over 20m$^3$.

12. A loop reactor as claimed in claim 11 wherein the reactor size is in the range 100-175m$^3$.

13. A process as claimed in claim 1 wherein the polymer produced has a molecular weight of less than 50 k Daltons.

14. A process as claimed in claim 1 wherein the polymer produced has a molecular weight of greater than 150 k Daltons.

* * * * *